United States Patent
Landreth et al.

(10) Patent No.: US 6,888,607 B2
(45) Date of Patent: May 3, 2005

(54) REWRITABLE SIGN SYSTEM

(75) Inventors: Bobby Dean Landreth, Ft. Lauderdale, FL (US); Steven D. Pratt, Ft. Lauderdale, FL (US); Robert W. Pennisi, Boca Raton, FL (US); Ronald J. Kelley, Coral Springs, FL (US); Sivakumar Muthuswamy, Plantation, FL (US); David S. Fredley, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 70 days.

(21) Appl. No.: 10/232,787

(22) Filed: Aug. 29, 2002

(65) Prior Publication Data

US 2004/0041971 A1 Mar. 4, 2004

(51) Int. Cl.[7] .............................................. G02F 1/1345
(52) U.S. Cl. ....................... 349/149; 349/115; 349/175; 349/182; 349/151; 349/152; 345/87
(58) Field of Search ................................ 349/149, 115, 349/175–185, 150–152; 345/87

(56) References Cited

U.S. PATENT DOCUMENTS

| | | | | |
|---|---|---|---|---|
| 6,262,672 B1 | * | 7/2001 | Brooksby et al. | 340/870.1 |
| 6,379,850 B1 | * | 4/2002 | Ueda et al. | 430/20 |
| 6,549,254 B1 | * | 4/2003 | Grupp et al. | 349/115 |
| 6,580,482 B1 | * | 6/2003 | Hiji et al. | 349/115 |

OTHER PUBLICATIONS

Yu, F.H. et al. *A New Driving Scheme for Reflective Bistable Cholesteric Liquid Crystal Displays*, SID 97 Digest.
Yip, W.C. et al., *Cost–effective Driving Scheme for Bistable Cholesteric Displays*, Jpn. J. Appl. Phys., vol. 39 (2000) pp. 5169–5172.
Landsburg, G. *Mixed–signal Driver Chips for Emerging Displays*, Jun. 29, 2001.
Ruth, J et al. *Low Cost Dynamic Drive Scheme for Reflective Bistable Cholesteric Liquid Crystal Displays*, Liquid Crystal Institute, (undated presentation overheads).

* cited by examiner

Primary Examiner—Michael G. Lee
Assistant Examiner—Seung H Lee
(74) Attorney, Agent, or Firm—Randi L. Karpinia

(57) ABSTRACT

Rewritable signs (100, 1300) that include bistable cholesteric liquid crystal layers (102, 1402, 1404, 1406) are provided. According to one embodiment a rewritable sign (100) is devoid of circuitry for establishing electric fields in localize regions for writing information to the rewritable sign (100), and is consequently inexpensive. In the latter embodiment, a separate information writer (400) that includes an array of pixel electrodes (404) that is driven by an active matrix (602) is used to write information on the rewritable sign. According to another embodiment a rewritable sign (1300) includes three cholesteric liquid layers (1402, 1404, 1406) each of which reflects a different primary color. The three cholesteric liquid crystal layers (1402, 1404, 1406) are interleaved with sets of conductive lines (1316, 1320, 1322, 1324) that are used to apply signals to the cholesteric liquid crystal layers (1402, 1404, 1406) for the purpose of writing information.

23 Claims, 8 Drawing Sheets

REWRITABLE SIGN SYSTEM

BACKGROUND OF THE INVENTION

1. Field of the Invention

The present invention relates in general to information presentation. More particularly, the present invention relates to rewritable information presentation systems.

2. Description of Related Art

The development of media on which to record information dates to the beginning of civilization itself. Paper is a common media for recording information. With the exception of the use of pencils, and erasable inks which work with varying degrees of success, recording (including printing and writing) on paper and other media is of a permanent nature. There are also various purposes for changeable non-permanent, presentation of information. In commercial settings, changeable signs consisting of individual indicia bearing placards which can be arranged as needed on a support to form text messages are known. Such devices are mechanical in nature and once prepared by a user do not require any power source for sustained operations. Whiteboards are also useful as an erasable medium for color hand written notes and diagrams. Whiteboards have to some extent, supplanted traditional blackboards and attained a degree of popularity in commercial settings.

The exponential growth of the Internet during the past decade has been accompanied by a massive increase in the amount of textual and graphical information that is stored electronically. Such information is typically viewed on a Cathode Ray Tube (CRT) or a nematic Liquid Crystal Display (LCD) type monitor. Such displays require electric power to sustain the display of information.

Recently so-called electronic paper has been developed. One form of electronic paper includes very small, brightly colored beads suspended in a thin layer of dark colored oil that is contained between two planar walls. By imagewise application of electric fields, the brightly colored beads are selectively caused to move toward one of the two walls, thereby forming a monochrome image that is composed of the brightly colored beads against a dark background of the oil. A variant of this technology uses tiny balls that each have a dark and a light colored hemisphere, and a permanent dipole moment. The balls are rotated by an imagewise applied field so as to selectively present either the dark hemisphere or the light hemisphere in a viewing direction thereby forming a monochrome image.

In the specific area of consumer electronics, and in particular in the area of wireless communication devices logos and names are sometimes printed on devices. Wireless network companies often desire that phones used in their system bear their company name or logo. This requires manufacturers of wireless communication devices to produce the same or similar wireless communication device with a myriad of different logo or wireless network company names.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE PREFERRED EMBODIMENTS

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Figure 1:
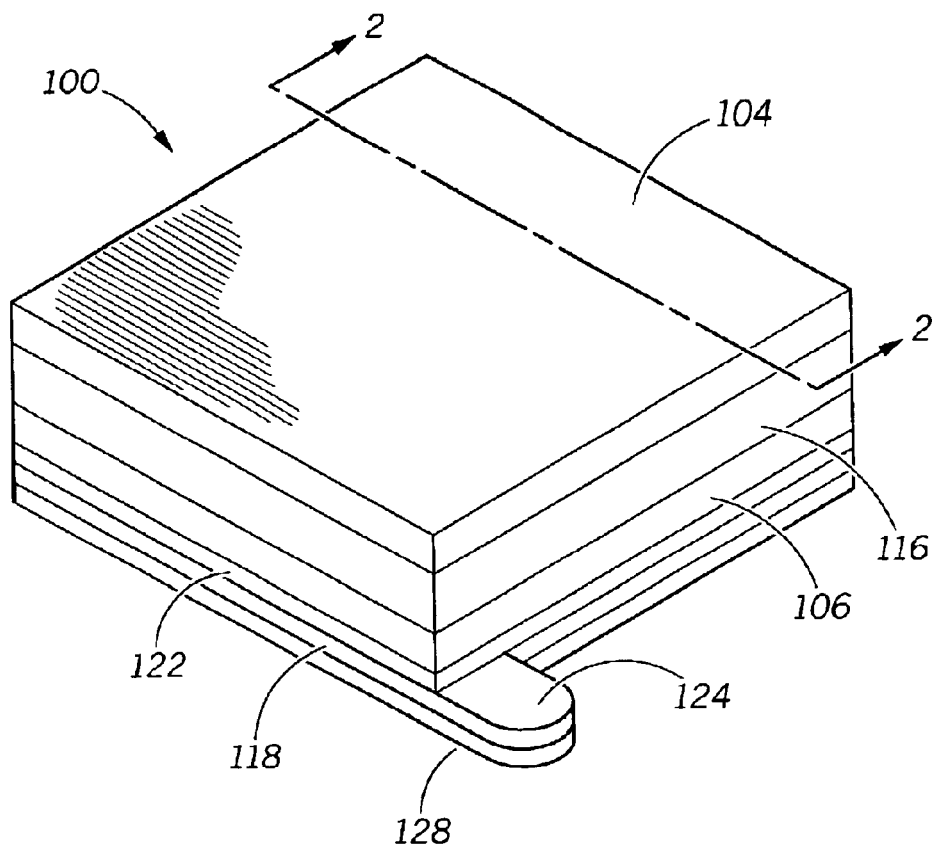
FIG. 1 is a perspective view of a rewritable sign according to a preferred embodiment of the invention.
Figure 2:
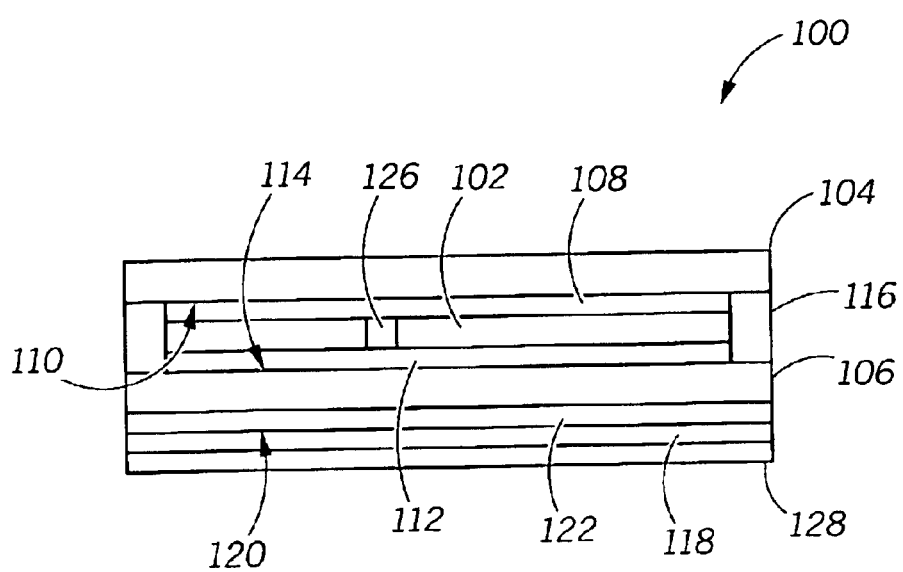
FIG. 2 is a cross sectional view of the rewritable sign shown in FIG. 1 according to the preferred embodiment of the invention.

FIG. 1 is a perspective view of a rewritable sign 100 according to a preferred embodiment of the invention and FIG. 2 is a cross sectional view of the rewritable sign 100 shown in FIG. 1. The rewritable sign 100 comprises a cholesteric liquid crystal layer 102 held between a first transparent panel 104, and a second panel 106. A first alignment layer 108 covers a surface 110 of first panel 104 facing the cholesteric liquid crystal layer 102. A second alignment layer 112 covers a first surface 114 of the second panel 106 also facing the cholesteric liquid crystal layer 102. The alignment layers 108, 112 preferably comprise rubbed polyimide. Alternatively, the first alignment layer 108 and the second alignment layer 112 are eliminated. Elimination of the alignment layers 108, 112 merely has the effect of changing the voltage amplitude requirements for signals used to write information to the rewritable sign 100. The cholesteric liquid crystal layer 102 is characterized by a helical pitch corresponding to a visible wavelength such that when it is in the planar cholesteric phase its reflectance is at least partially in the visible portion of the spectrum. The cholesteric liquid crystal layer 102 can assume multiple phases including the aforementioned planar phase in which it exhibits a Bragg like reflectivity, and a focal conic phase in which it transmits and scatters light. The cholesteric liquid crystal layer is bistable in that both the planar phase and the focal conic phase are stable.

A light absorbing layer is preferably provided in the rewritable sign 100 on a side cholesteric liquid crystal layer 102 opposite from the first transparent panel 104. Such a light absorbing layer serves to absorb light when the cholesteric liquid crystal layer 102 is in a substantially non reflective state (e.g., the focal conic state). The second panel 106 preferably serves as the light absorbing layer. Alternatively a separate light absorbing layer or coating (not shown) is provided.

Given the presence of the light absorbing layer (e.g., in the form of a dark second panel 106), the focal conic phase which scatters and transmits light appears dark. By making certain portions of the cholesteric liquid crystal layer 102 assume the planar phase and other portions assume the focal conic phase and selecting such portions in accordance with image information, the cholesteric liquid crystal layer 102 is made to bear information (e.g., text or graphics). The fact that the cholesteric liquid crystal layer 102 is bistable allows the rewritable sign 100 to retain information without drawing power. The latter characteristic opens up a wide range of applications for the rewritable sign 100.

An adhesive sealant 116 surrounds the cholesteric liquid crystal layer 102, and bonds the first panel 104 to the second panel 106. Alternatively, the first and second panels 104, 106 are bonded together without an adhesive sealant using compression, heating, and/or ultrasonic energy. One or more spacers 126 assist in maintaining spacing between the first 104 and second 106 panels.

A ground plane 118 is affixed to a second surface 120 of the second panel 106 opposite the cholesteric liquid crystal layer 102 by a first adhesive layer 122. The ground plane 118 includes a contact portion 124 that extends beyond the periphery of the first and second panels 104, 106. Rather than including the ground plane 118 in the rewritable sign 100, the rewritable sign 100 can be placed on a conductive support while information is written to the rewritable sign 100.

A second adhesive layer 128 is provided on the ground plane 118 opposite the first adhesive layer 122. The second adhesive layer 128 is used for mounting the rewritable sign 100 on a surface. Alternatively, the second adhesive layer 128 is eliminated.

Because the rewritable sign 100 does not include circuitry such as row conductive lines, column conductive lines, or thin film transistors for applying fields to localized regions of the cholesteric liquid crystal layer 102 in order to write information, the rewritable sign 100 can be manufactured relatively cheaply. Because, there is no need to fabricate circuitry on or within the rewritable sign 100, the choice of materials (e.g., for panels 104, 106) is less constrained. It is not necessary to use materials capable of withstanding high temperature fabrication processes such as polysilicon deposition.

Rather than including one cholesteric liquid crystal layer 102 as shown in FIGS. 1–2, the rewritable sign 100 can include multiple cholesteric liquid crystal layers that are separated by separator panels. For example, both left and right handed cholesteric liquid crystal layers, preferably having substantially overlapping spectral reflectances can be provided. In as much as left hand cholesteric liquid crystal reflects left hand polarized light, and right hand cholesteric liquid crystal reflects right hand polarized light, by providing both left and right hand cholesteric liquid crystal layers selective reflectance of the rewritable sign 100 is increased, and consequently contrast is increased. In another alternative including multiple cholesteric liquid crystal layers, cholesteric liquid crystal layers have different pitches and/or different index of refraction anisotropies and consequently different reflectance spectrums are provided to obtain different color images or different levels of contrast.

Figure 3:
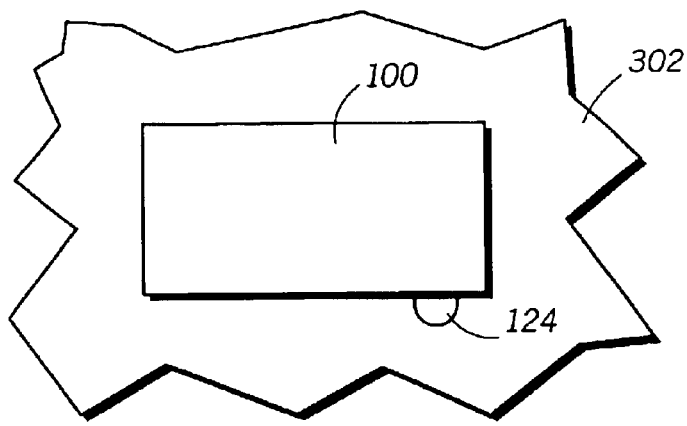
FIG. 3 is a front view of a generic surface supporting the rewritable sign shown in FIGS. 1–2.

FIG. 3 is a front view of a generic surface 302 supporting the rewritable sign 100 shown in FIG. 1.

Figure 4:
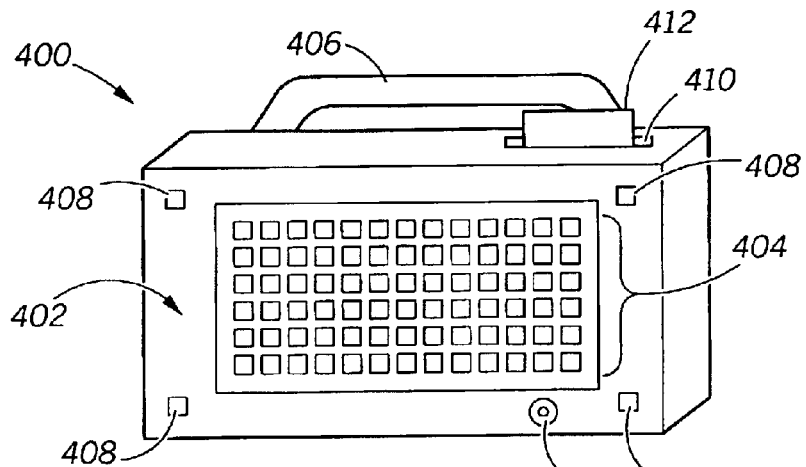
FIG. 4 is a perspective view of an information writer for writing information on the rewritable sign shown in FIGS. 1–3 according to the preferred embodiment of the invention.
Figure 5:
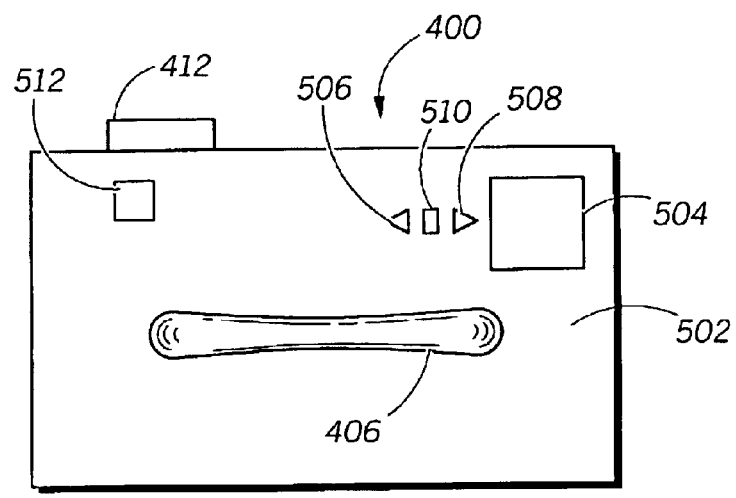
FIG. 5 is a back view of the information writer shown in FIG. 4 according to the preferred embodiment of the invention.

FIG. 4 is a perspective view of an information writer 400 for writing information on the rewritable sign shown in FIGS. 1–3 according to the preferred embodiment of the invention and FIG. 5 is a back view of the information writer 400 shown in FIG. 4. Referring to FIGS. 4–5, the information writer 400 comprises a front surface 402 that includes an array of pixel electrodes 404. A handle 406 is provided for holding and positioning the information writer 400. A plurality of rubber pads 408, which aid in preventing the information writer 400 from moving while it is held against a surface (e.g., generic surface 302) are located around the pixel array 404 on the front surface 402. A ground plane contact 414 that, in operation, contacts the contact portion 124 of the ground plane 118 of the rewritable sign 100 is also located on the front surface 402 of the information writer 400.

A computer readable medium reader 410 is included in the information writer 400. A computer readable medium 412 is shown in place in the computer readable medium reader 410. The computer readable medium 412 can for example take the form of a flash memory card. The computer readable medium 412 is used to store information that is to be written to the rewritable sign 100 by the information writer 400. Alternatively, another type of information input such as an Input/Output (I/O) interface is provided for coupling the information writer 400 to an information source external to the information writer 400.

A back surface 502 of the information writer, includes a display 504 for previewing information prior to writing the information on the rewritable sign 100, and a plurality of control buttons 506–512. The control buttons 506–512 include a first navigation button 506 and a second navigation button 508 for navigating between one or more frames of information stored on the computer readable medium 412 as the frames are displayed on the display 504, a selection button 510 for selecting a frame of information, and a write button 512 for initiating a process of writing a frame of information that is stored on the computer readable medium 412, and displayed on the display 504, to the rewritable sign 100.

In operation, the information writer 400 is held over the rewritable sign 100 with the front surface 402 of the information writer 400 overlying the rewritable sign 100. During a process of writing information on the rewritable sign 100, voltage signals are applied to the array of pixel electrodes 404, so as to establish electric fields between the pixel electrodes 404 and the ground plane 118 of the rewritable sign 100. Such electric fields pass through the cholesteric liquid crystal layer 102, and perceptibly alter the phase of the cholesteric liquid crystal layer 102 in localized regions thereby writing information on the rewritable sign 100. High magnitude fields are used to induce or sustain the planar cholesteric phase, and lower magnitude fields are used to induce or sustain the focal conic phase. Note that the operation of the information writer does not require current to pass from the pixel electrodes 404 into the rewritable sign 100. Information written on the rewritable sign 100 can include text and/or images.

Alternatively, rather than providing the array of pixel electrodes 404, Electrodes have predefined patterns such as text, and/or graphics (e.g., logos) are included on the information writer 400.

Figure 6:
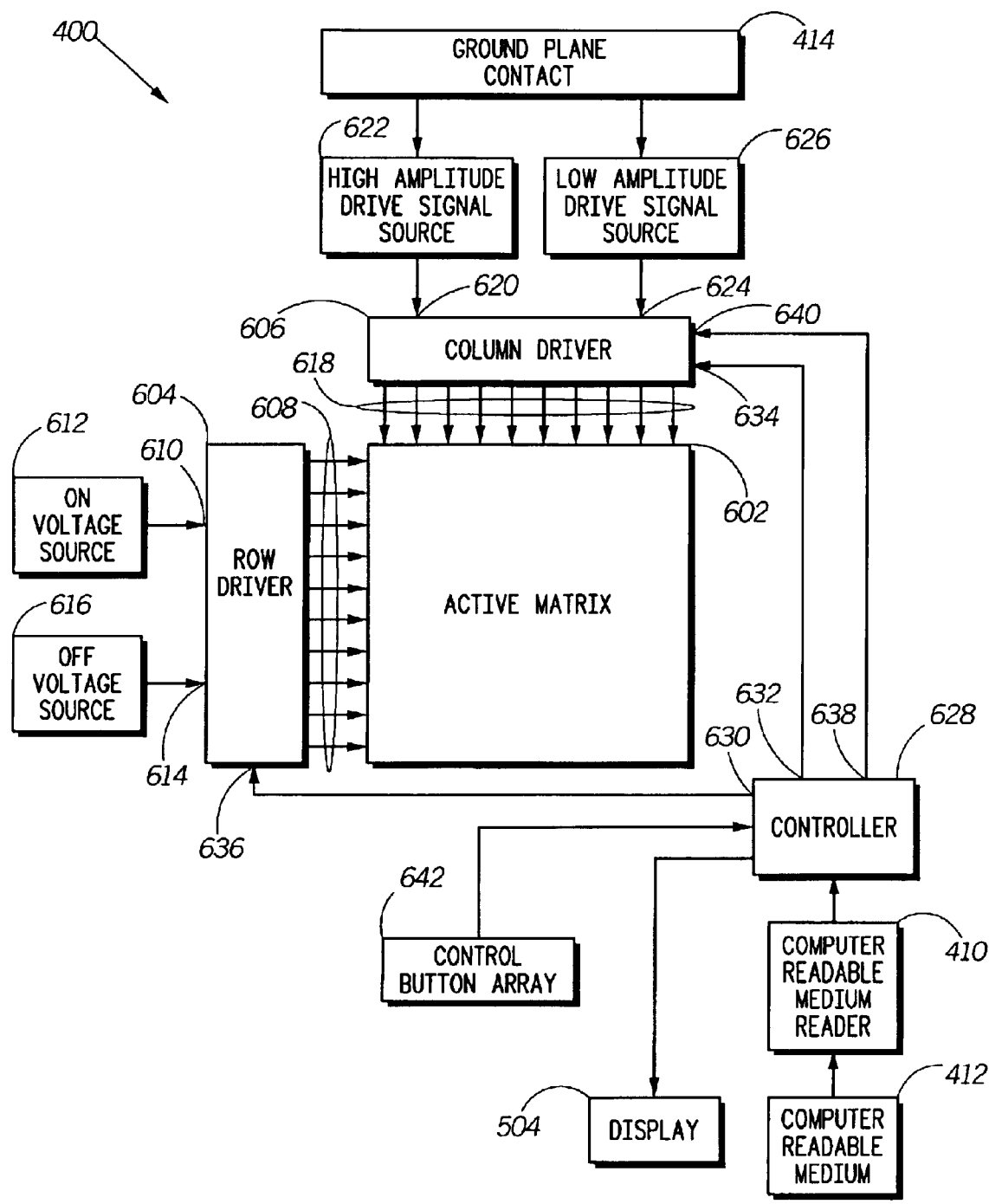
FIG. 6 is a block diagram of the information writer shown in FIGS. 4 and 5 according to the preferred embodiment of the invention.
Figure 7:
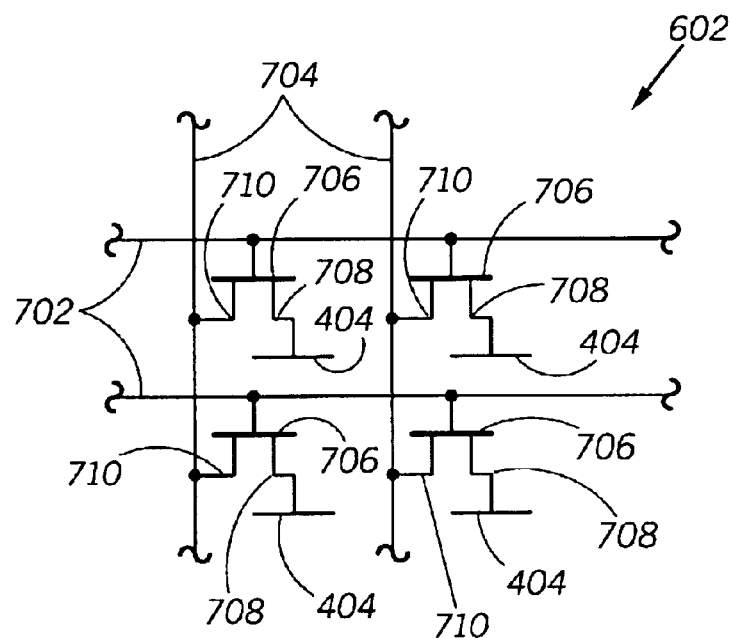
FIG. 7 is an electrical schematic of a portion of an active matrix that is part of the information writer shown in FIGS. 4–6 according to the preferred embodiment of the invention.

FIG. 6 is a block diagram of the information writer 400 shown in FIGS. 4 and 5 according to the preferred embodiment of the invention and FIG. 7 is an electrical schematic of a portion of an active matrix 602 that is part of the information writer 400 shown in FIGS. 4–6. As shown in FIG. 7, the active matrix 402 includes a plurality of row conductive lines 702 and a plurality of column conductive lines 704. Although only two row conductive lines 702, and two column conductive lines 704 are shown for the purpose of illustration, in practice there are preferably as many row conductive lines 702 as there are rows of pixel electrodes 404 in the array of pixel electrodes 404, and as many column conductive lines 704 as there are columns of pixels electrodes 404 in the array of pixel electrodes 404. Each of the pixel electrodes 404 is coupled to a first drain/source terminal 708 of a transistor 706 in the active matrix 602. Each particular transistor 706 includes a gate terminal coupled to a particular row conductive line 702 among the plurality of row conductive lines 702 that serves a particular row of pixel electrodes 404 including the pixel electrode 404 to which the particular transistor 706 is coupled. Furthermore, each particular transistor 706 includes a second drain/source terminal 710 that is coupled to a particular column conductive line 704 among the plurality of column conductive lines 704 that serves a particular column of pixel electrodes 404 including the pixel electrode 404 to which the particular transistor 706 is coupled. The term 'drain/source terminal' is used because signals of either polarity can be coupled through the transistors 706 for driving the pixel electrodes 404. Signals applied to the row conductive lines 702 are used to selectively turn on and off the transistor 706. Signals applied to the column conductive lines 704 are selectively applied to the pixel electrodes 404 for inducing or sustaining the focal conic or planar cholesteric phase. Signals applied on the column conductive lines 704 reach a particular pixel electrode 404 when a transistor 706 that is coupled to the particular pixel electrode 404 is turned on.

Referring to FIG. 6, the information writer 400 is seen to include a row driver 604, and a column driver 606 coupled to the active matrix 602. The row driver 604 includes a plurality of outputs 608 that are coupled to the row conductive lines 702 of the active matrix 602. The row driver 604 further comprises a first input 610 coupled to a transistor turn on voltage source 612, and a second input 614 coupled to a transistor turn off voltage sources 616. Voltages output by the voltages sources 612, 616 are preferably sufficiently separated to bracket signals output by the column driver 606 so that the transistors 706 are turned fully on and off. The row driver 604 preferably sequentially turns on transistors 706 associated with successive rows of pixel electrodes 404 of the active matrix 602. The row driver 604 also includes a timing control input 636.

The column driver 606 includes a plurality of outputs 618 that are coupled to the column conductive lines 704 of the active matrix 602. The column driver 606 further comprises a first input 620 that is coupled to a high amplitude drive signal source 622, and a second input 624 that is coupled to a low amplitude drive signal source 626. The drive signal sources 622, 626 are also coupled to the ground plane contact 414. In operation the column driver 606 preferably couples either the high amplitude drive signal source 622 or the low amplitude drive signal source 626 to each of the column conductive lines 704 during each period during which transistors 706 in a row of the active matrix 602 are selected. A signal from the high amplitude drive signal source 622 when applied to a particular pixel electrode 404 causes the cholesteric liquid crystal layer 102 underlying the particular pixel electrode 404 to transition to, or stay in a reflective planar phase. On the other hand, a signal from the low amplitude drive signal source 626 when applied to a particular pixel electrode 404 causes the cholesteric liquid crystal layer 102 underlying the particular pixel electrode to transition to, or stay in a scattering focal conic phase.

The information writer 400 further comprises a controller 628 that includes a first sync signal output 630 that is coupled to the timing control input 636 of the row driver 604. The controller 628 also includes an image data output 632 that is coupled to an image data input 634 of the column driver 606. The controller 628 further comprises a second sync signal output 638 that is coupled to a latch signal input 640 of the column driver 606. The computer readable medium reader 410 is coupled to the controller 628. The computer readable medium 412 is detachably coupled to the computer readable medium reader 410. A control button array 642 that includes the control buttons 506–512 is also coupled to the controller 628. The controller 628 preferably comprises a microcontroller and associated interface circuitry. The controller 628 is also coupled to the display 504.

In operation the controller 628 outputs image data at the image data output 632, outputs a first sync signal at the first sync signal output 630, and outputs a second sync signal at the at the second sync signal output 638 in order to synchronize the selection of rows by the row driver 604 with image data reaching the active matrix 602. While the transistors 706 in each row of the active matrix 602 are turned on, the column driver 606 selectively applies signals from one of the drive signal sources 622, 626 to each column conductive line 704 of the active matrix 602 in accordance with image data received from the controller 630.

Figure 8:
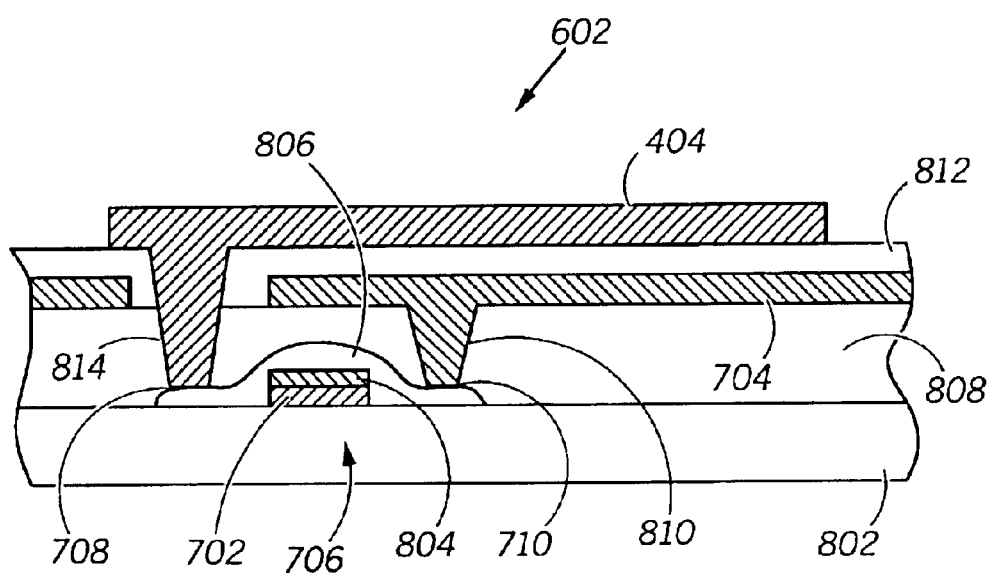
FIG. 8 is a fragmentary sectional elevation view of the active matrix shown in FIG. 7 according to the preferred embodiment of the invention.

FIG. 8 is a fragmentary sectional elevation view of the active matrix 602 shown in FIG. 7 according to the preferred embodiment of the invention. FIG. 8 shows a single pixel electrode 404 and associated transistor 706. The active matrix 602 is fabricated on a substrate 802. The row conductive lines 702 are formed on the substrate 802. Gate insulation 804 is formed over the row conductive lines 702 covering at least portions of the row conductive lines 702 at which the transistors 706 are formed. Semiconductor material 806 that forms drain/source and channel regions of the transistors 706 is formed over the gate insulation 804. Portions of the row conductive lines 702 underlying the semiconductor material 806 serve as gate electrodes. Drain/source regions of the semiconductor material 806 are preferably degeneratively doped to allow for good ohmic contact. A first insulation layer 808 is formed over the transistors 706. The column conductive lines 704 are formed on the first insulation layer 808. First plugs 810 extend from the column conductive lines 704 through vias in the first insulation layer 808 to drain/source regions of the semiconductor material 806 that serve as the second drain/source 710 terminals of the transistors 706. A second insulation layer 812 is formed over the first insulation layer 808 covering the column conductive lines 704. The pixel electrodes 404 are formed on the second insulation layer 812. Second plugs 814 extend through a vias through the first and second insulation layers 808, 812 to drain/source regions of the transistors 706 that serve as the first drain/source terminals 708 of the transistors 706. The column conductive lines 704 curve around the second plugs 814 (in a plane perpendicular to the plane of the drawing sheet) to avoid electrical shorting.

Figure 9:
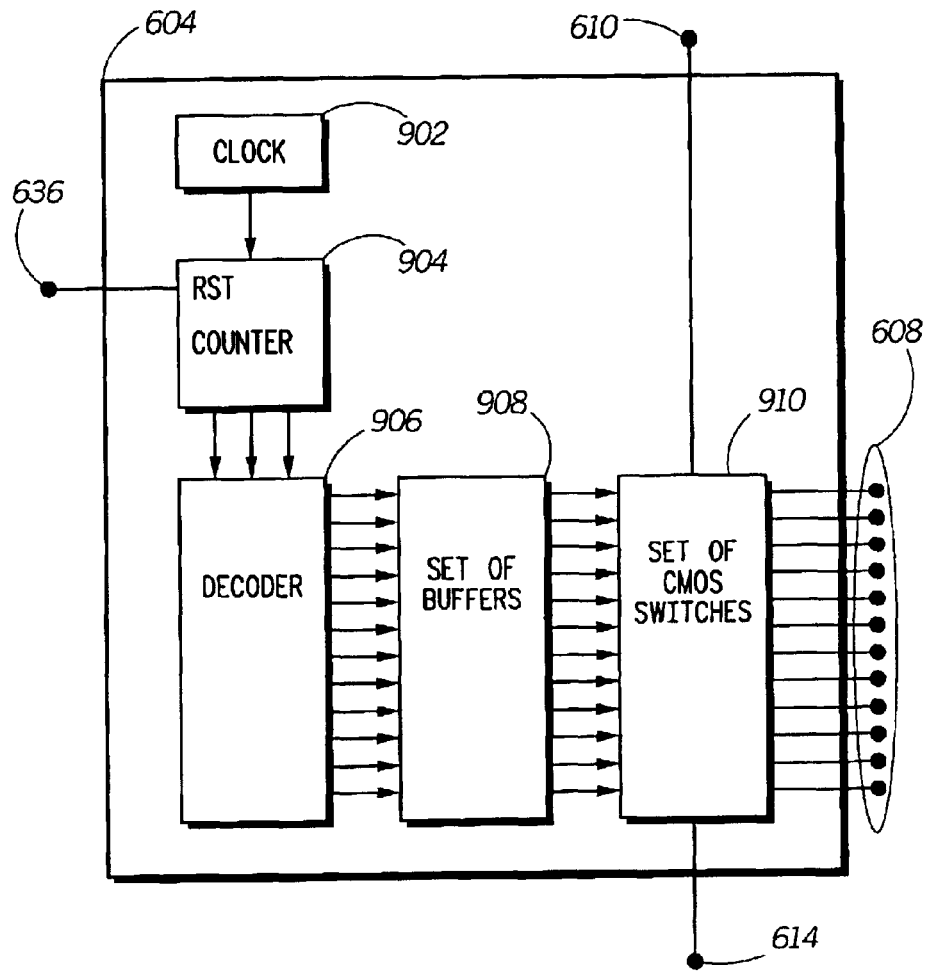
FIG. 9 is a block diagram of a row driver of the information writer shown in FIGS. 4–6 according to the preferred embodiment of the invention.

FIG. 9 is a block diagram of a row driver 604 of the information writer 400 shown in FIGS. 4–6 according to the preferred embodiment of the invention. As shown in FIG. 9, a clock 902 is coupled to a counter 904. The clock 902 drives the counter 904. The counter 904 includes a plurality of count outputs coupled to a decoder 906. The decoder 906 sets one of a plurality of decoder outputs to an active state in response to a count received from counter 904. The plurality of decoder outputs are coupled through a set of buffers 908 to a set of Complementary Metal Oxide Semiconductor (CMOS) switches 910. Each of the set of CMOS switches 910 drives a row conductive line 702 that is coupled to one of the plurality of row decoder outputs 608. Each CMOS switch 910 includes a first supply terminal coupled to the turn on voltage source 612 through the first input 610 of the row driver 604, and second supply terminal coupled to the turnoff voltage source 616 through the second input 614 of the row driver 604. Alternatively, another type of line driver is used in place of the CMOS switches 910. The timing control input 636 of the row driver 604 is coupled a reset pin (RST) of the counter 904. Thus, the time at which a first row is selected can be determined by applying a reset signal to the timing control input 636.

Figure 10:
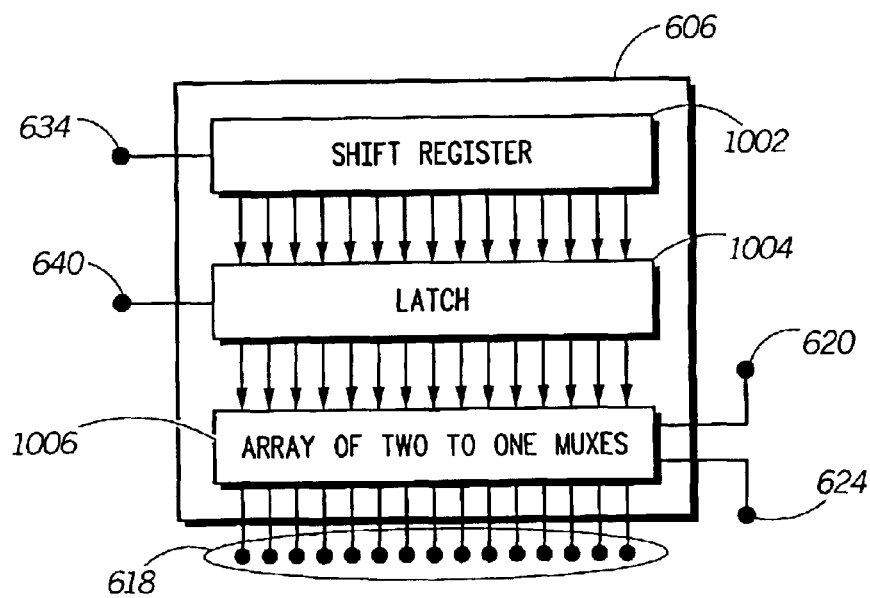
FIG. 10 is a block diagram of a column driver of the information writer shown in FIGS. 4–6 according to the preferred embodiment of the invention.

FIG. 10 is a block diagram of the column driver 606 of the information writer 400 shown in FIGS. 4–6 according to the preferred embodiment of the invention. As shown in FIG. 10 the column driver 606 includes a shift register 1002, a latch 1004, and an array of two-to-one multiplexers 1006. The data input 634 of the column driver 606 serves as a serial input of the shift register 1002. The shift register 1002 includes a plurality of outputs (one for each column conductive line 704 of the active matrix 602) that are coupled through the latch 1004, to select inputs of the array of two-to-one multiplexers 1006. The second sync signal which is received at the latch signal input 640, controls the transfer of data across the latch 1004. Data transferred across the latch 1004 from the shift register 1002 controls which of two signal inputs of each two-to-one multiplexer in the array of two-to-one multiplexers 1006 is coupled to an output of each of the two-to-one multiplexer 1006. Each two-to-one multiplexer 1006 receives, at a first signal input, the signal from the high amplitude drive signal source 622 and receives, at a second signal input, the signal from the low amplitude drive signal source 626. The signal from the high amplitude drive signal source 622 is coupled to the array of two-to-one multiplexers 1006 through the first input 620 of the column driver 606, and the signal from the low amplitude drive signal source 626 is coupled to the array of two-to-one multiplexers 1006 through the second input 624 of the column driver 606. Outputs of the two-to-one multiplexers in the array of two-to-one multiplexers 1006 serve as the outputs 618 of the column driver 606.

The drive signal sources 622, 626 preferably output unipolar signals. The appropriate voltage levels are in theory dependent on the thickness cholesteric liquid crystal layer 102 as well as the physical properties of the cholesteric liquid crystal layer 102. In practice, the appropriate voltage levels for the drive signal sources 622, 626 are determined by routine experimentation (for example a series of test voltages are used and the effect of each test voltage on the phase of the cholesteric liquid crystal layer 102 observed in order to determine appropriate voltages).

Figure 11:
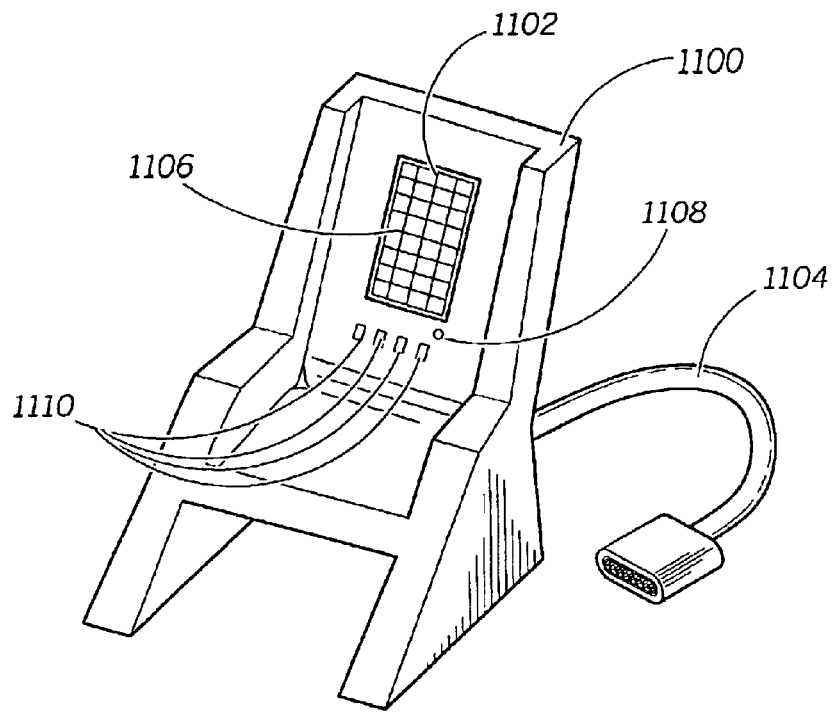
FIG. 11 is perspective view of a cradle for a telephone that includes an information writer similar to that illustrated in FIGS. 6–10 according to a first alternative embodiment of the invention.
Figure 12:
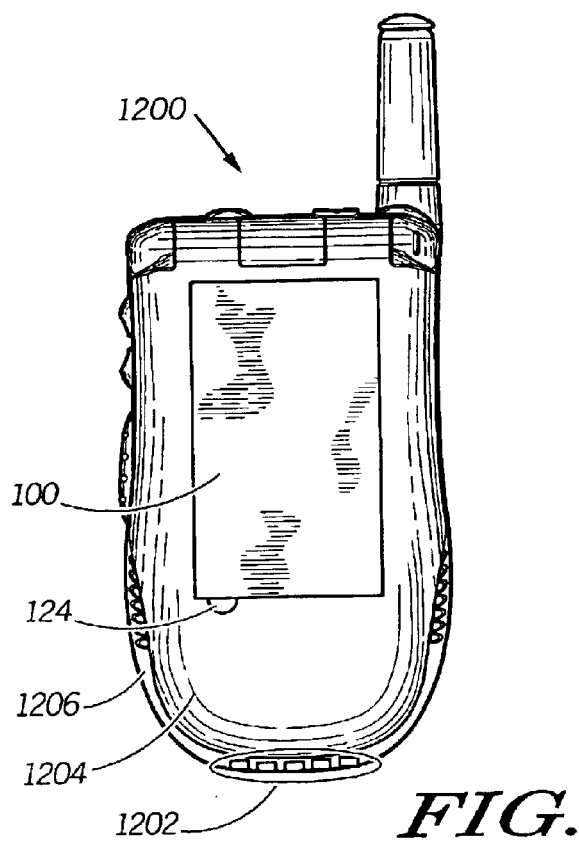
FIG. 12 is a perspective view of a telephone supporting the rewritable sign shown in FIGS. 1–2.

FIG. 11 is perspective view of a cradle 1100 for a wireless telephone 1200 (FIG. 12). The cradle 1100 includes an information writer 1102 similar to that illustrated in FIGS. 6–10. FIG. 12 is a perspective view of the telephone 1200 on which a rewritable sign 100 of the type shown in FIG. 1 is supported. The information writer 1102 that is incorporated into the cradle 1100 differs from that illustrated in FIG. 6, in that in lieu of including computer readable medium 410, the information writer 1102 includes an I/O interface (not shown). The I/O interface can for example comprise a Universal Serial Bus (USB) interface. A cable 1104 is provided for coupling the included I/O interface to an external information source. The external information source to which the cable 1104 is connected can for example comprise a personal computer that is configured with software for transferring information to the cradle 1100.

The information writer 1102 of the cradle 1100 includes an active matrix 1106 for applying localized electric fields to the cholesteric liquid crystal layer for impressing information thereon, and a ground contact terminal 1108 for coupling to the contact portion 124 of the ground plane 118. The cradle 1100 further comprises a number of electrical contacts 1110 that mate with complementary electrical contacts 1202 of the wireless telephone 1200.

The telephone 1200 is a clamshell type that includes an upper part 1204, and a lower part 1206. As shown in FIG. 12, the rewritable sign 100 is supported on an outside surface of the upper part 1204. In writing information on the rewritable sign, the telephone 1200 is placed in the cradle 110 with the rewritable sign 100 facing the active matrix 1106 of the information writer 1102, and the information writer 1102 is operated in the manner described above in connection with the preferred embodiment.

The rewritable sign 100 can be applied to other types of portable electronic devices as well in order to allow semi permanent but changeable information to be written on the surface of the portable electronic devices. Such information can for example include data that is useful in operating the portable electronic apparatus such as phone numbers, graphics which lend a pleasing appearance to the portable electronic apparatus, or logos of network service providers.

Figure 13:
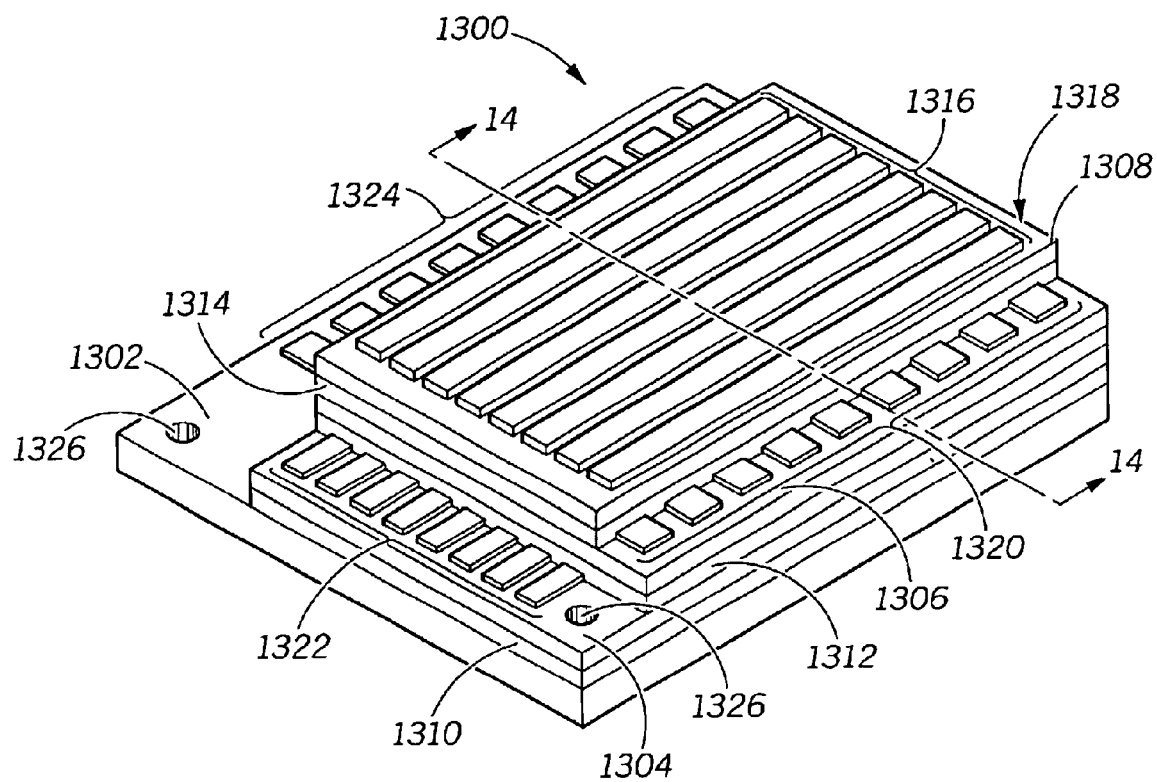
FIG. 13 is perspective view of a rewritable sign according to a second alternative embodiment of the invention.
Figure 14:
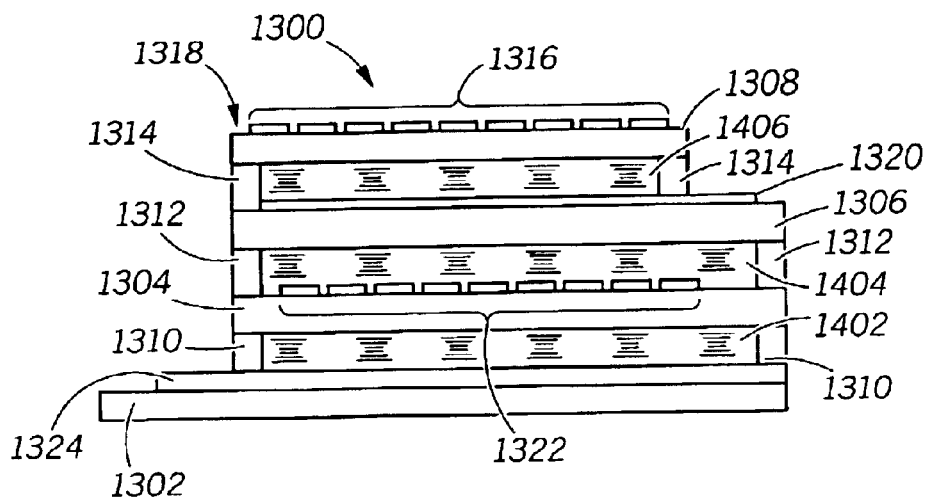
FIG. 14 is a sectional elevation view of the rewritable sign shown in FIG. 13 according to the second alternative embodiment of the invention.

FIG. 13 is perspective view of a rewritable sign 1300 according to a second alternative embodiment of the invention and FIG. 14 is a sectional elevation view of the rewritable sign 1300 shown in FIG. 13. Note that the height dimension in FIGS. 13–14 is exaggerated relative to the lateral dimensions in order to more clearly illustrate the various layers of the rewritable sign 1300. The second rewritable sign 1300 includes a red light reflecting cholesteric liquid crystal layer 1402, a green light reflecting cholesteric liquid crystal layer 1404, and a blue light reflecting cholesteric liquid crystal layer 1406. The red light reflecting cholesteric liquid crystal layer 1402 is held between a first panel 1302, and a second panel 1304. The green light reflecting cholesteric liquid crystal 1404 is held between the second panel 1304, and a third panel 1306. The blue light reflecting cholesteric liquid crystal 1406 is held between the third panel 1306 and a fourth panel 1308. The second 1304, third 1306, and fourth 1308 panels are transparent.

A first sealant 1310 bonds the first panel 1302 to the second panel 1304 and surrounds the red light reflecting cholesteric liquid crystal layer 1402. A second sealant 1312 bonds the second panel 1304 to the third panel 1306, and surrounds the green light reflecting cholesteric liquid crystal layer 1404. A third sealant 1314 bonds the third panel 1306 to the fourth panel 1308 and holds in the blue light reflecting cholesteric liquid crystal layer 1406.

A first set of parallel linear conductive lines 1316 runs over a top exposed surface 1318 of the forth panel 1308. A second set of parallel conductive lines 1320 is supported on the third panel 1306. A third set of set of parallel conductive lines 1322 is supported on the second panel 1304, and a fourth set of parallel conductive lines 1324 is supported on the first panel 1302. The first set of parallel conductive lines 1316 is parallel to the third set of parallel conductive lines 1322, and perpendicular to the second 1320 and fourth 1324 sets of parallel conductive lines. The first 1316, second 1320, and third 1322 sets of parallel conductive lines are preferably formed out of a transparent conductive material such as indium-tin-oxide. Alternatively, the latter three sets of parallel conductive lines 1316, 1320, 1322 are foraminous and have a high percentage of open area.

Figure 15:
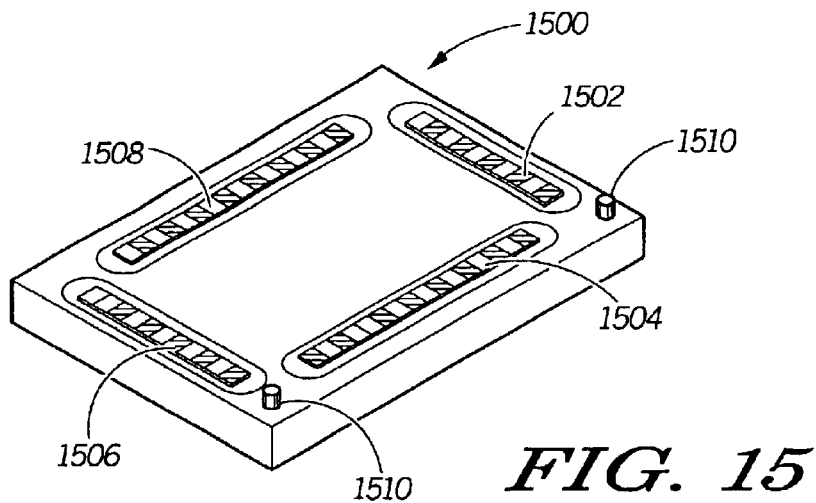
FIG. 15 is a perspective view of an information writer for the rewritable sign shown in FIGS. 13–14 according to the second alternative embodiment of the invention.

In the second alternative rewritable sign 1300 each particular set of parallel conductive lines, extends onto a marginal portion of the panel on which the particular set of parallel conductive lines is supported which lies beyond the periphery of panels located above such set of conductive lines and supporting panel. The latter arrangement provides for access to at least end portions of the parallel conductive lines 1320, 1322, 1324. The ends of the parallel conductive lines serve as terminals that can be disengageably coupled to a second alternative information writer 1500 (FIG. 15). In particular, the first panel 1302, and the fourth set of parallel conductive lines 1324 extend beyond the periphery of the second 1304, third 1306, and fourth 1308 panels. Similarly, the second panel 1304, and the third set of parallel conductive lines 1322 extend beyond the periphery of the third 1306, and fourth 1308 panels, and the third panel 1306 extends beyond the periphery of the fourth panel 1308. The second alternative rewritable sign includes two alignment holes 1326 to aid in aligning elastomeric contacts 1502–1508 (FIG. 15) with the exposed portions of the parallel conductive lines 1316, 1320, 1322, 1324.

In order to write information to the blue light reflecting cholesteric liquid crystal layer 1406 signals are applied to the first 1316 and second 1320 sets of parallel conducting lines. In order to write information to the green light reflecting cholesteric liquid crystal layer 1404 signals are applied to the second 1320 and third 1322 sets of parallel conducting lines, and in order to write information to the red light reflecting cholesteric liquid crystal layer 1402 signals are applied to the third 1322 and fourth 1324 sets of parallel conductive lines. A variety of electronic circuits and signal schemes for writing information on a cholesteric layer by applying signals two mutually perpendicular sets of parallel conductive lines that are disposed on opposite sides of the cholesteric layer are know to persons having ordinary skill in the art. Information is written to one cholesteric layer of second alternative rewritable sign 1300 at a time in order to avoid signal conflicts.

Although as illustrated only one cholesteric liquid crystal layer is provided for each primary color, alternatively each cholesteric liquid crystal layer shown in FIGS. 13–14 is replaced with a left handed, and a right handed cholesteric liquid crystal layer that are separated by a separator panel. Providing both left and right hand cholesteric liquid crystal layers for each primary color would increase the contrast of information displayed on the second alternative rewritable sign 1300. Although, as illustrated the second alternative rewritable sign 1300 includes three cholesteric liquid crystal layers 1402, 1404, 1406, alternatively less than three cholesteric liquid crystal layers are used.

According to another alternative embodiment of the invention rather that providing sets of parallel conductive lines, patterned electrodes are provided. Such patterned electrodes would be used to selectively activate predetermined patterns (e.g., logos) on the rewritable sign 1300.

FIG. 15 is a perspective view of an information writer 1500 for the rewritable sign shown in FIGS. 13–14 according to the second alternative embodiment of the invention. In lieu of the active matrix 602 of the information writer shown in FIGS. 4–10, the second alternative information writer 1500 includes a first elastomeric contact 1502, a second elastomeric contact 1504, a third elastomeric contact 1506, and a fourth elastomeric contact 1508 on a front surface 1512 of the second alternative information writer 1500. Each of the elastomeric contacts includes a plurality of conductive regions for contacting the exposed portions of the parallel conductive lines 1316, 1320,132, 1324. The conductive regions are insulated from each other by insulating regions. Alignment pins 1510 that extend out of the front surface 1512 aid in aligning the elastomeric contacts 1502–1508 with exposed portions of the sets of parallel conductive lines 1316, 1320, 1322, 1324. In use, the information writer 1500 is brought into contact with the second alternative rewritable sign 1300 such that the alignment pins 1510 insert into the alignment holes 1326 and the elastomeric contacts 1502, 1504, 1506, 1508 make electrical contact with exposed end portions of the sets of parallel conductive lines portions 1316, 1320, 1322, 1324. Thereafter circuits of the information writer 1500 are operated to write information to the cholesteric liquid crystal layers 1402, 1404, 1406 one at a time. The second alternative rewritable sign is capable of bearing full color information.

Figure 16:
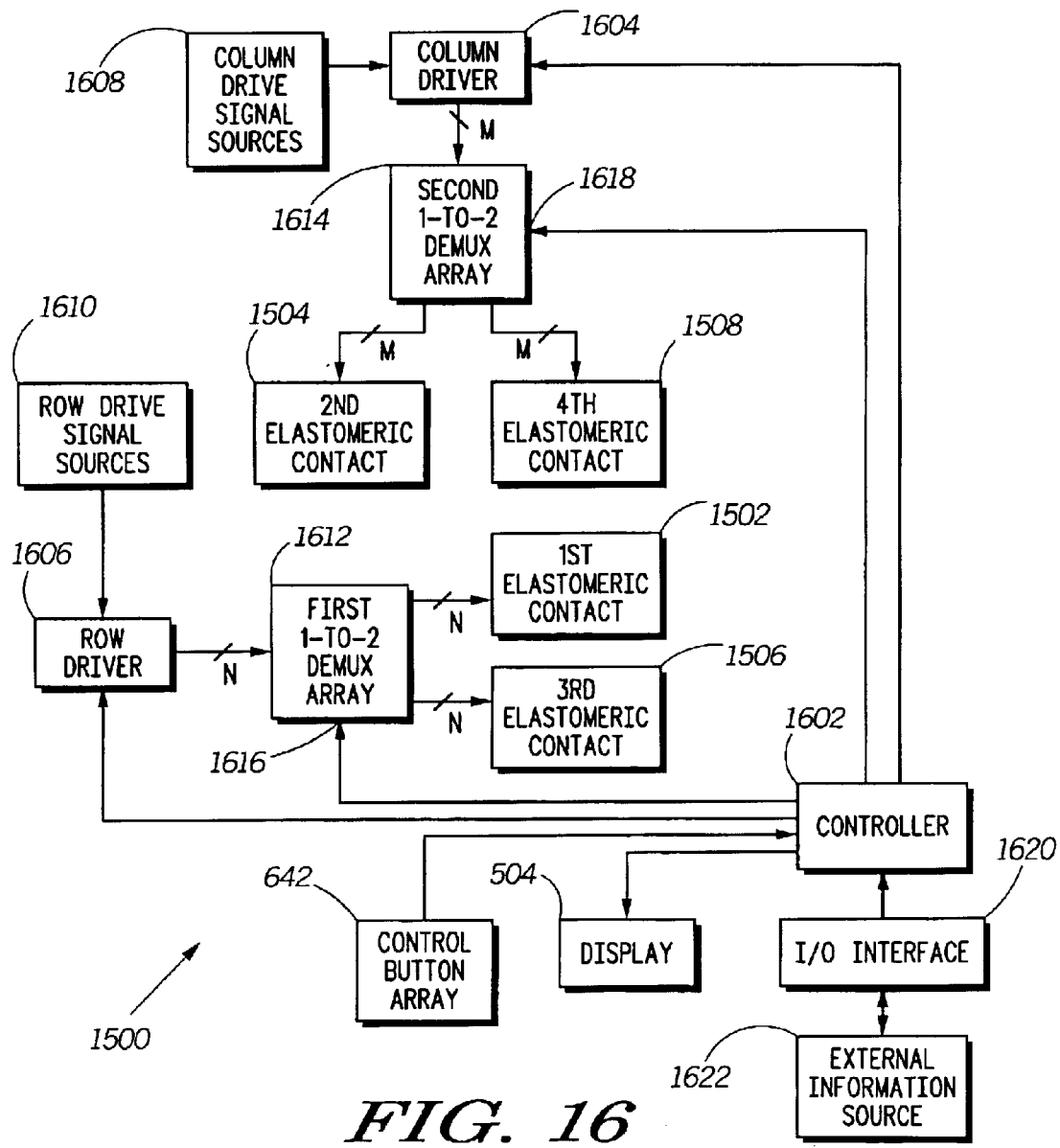
FIG. 16 is a block diagram of the information writer shown in FIG. 15 according to the second alternative embodiment of the invention.

FIG. 16 is a block diagram of the information writer 1500 shown in FIG. 15 according to the second alternative embodiment of the invention. Referring to FIG. 16, a controller 1602 is coupled to a column driver 1604 and a row driver 1606 to which the controller 1602 supplies image information. One or more column drive signal sources 1608 are coupled to the column driver 1604 for supplying column drive signals thereto. Similarly, one or more row driver sources 1610 are coupled to the row driver 1606 for supplying row drive signals thereto. The row driver 1606 has a number N of outputs equal to a number of row lines (e.g., the number of lines in each of the second 1320 and fourth 1324 sets of conductive lines). Outputs of the row driver 1606 are coupled through a first 1-to-2 demultiplexer array 1612 to either the first elastomeric contact 1520, or the third elastomeric contact 1506. The column driver 1604 has a number M of outputs equal to a number of column lines (e.g., the number of lines in each of the first 1316, and third 1322 sets of conductive lines). Outputs of the column driver 1604 are coupled through a second 1-to-2 demultiplexer array 1614 to either the second elastomeric contact 1504 or the fourth elastomeric contact 1508. The controller 1602 is coupled to a control input 1616 of the first 1-to-2 demultiplexer array 1612 and is also coupled to a control input 1618 of the second 1-to-2 demultiplexer array 1614 for controlling which of the elastomeric contacts 1502–1508 receive signals from the column driver 1604, and the row driver 1606.

The controller 1602 is coupled through an associated I/O interface 1620 to an external information source 1622 from which information to be written on second alternative rewritable sign 1500 is received. As in the case of the preferred embodiment information writer 400, the second alternative information writer 1500 also comprises the display 504, and the control button array 642 which are also coupled to the controller 1602.

According to a third alternative embodiment of the invention the wireless telephone 1200 is modified to incorporate circuitry of the second alternative information writer that is illustrated, in block diagram form, in FIG. 16 and the rewritable sign 1300 shown in FIGS. 13–14. In the third alternative embodiment the I/O interface 1620 receives information to be written on the rewritable sign 1300 from the external information source 1622 (e.g., a personal computer) through connections made between the electrical contacts 1110 of the cradle 1100, and electrical contacts 1202 of the telephone 1200. The third alternative embodiment also provides for writing of information to the rewritable sign 1300 that for example lends a pleasing appearance to the telephone 1200 or includes a company logo. One use of the third alternative embodiment might be to display graphics associated with music that is loaded into the wireless telephone 1200 for later playback. In the latter case the telephone 1200 also includes circuitry for music playback (e.g., a compressed music decoder). Another use of the third alternative embodiment might be to display graphics that reflect a user's personal style or complement clothing to be worn by the user.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. A rewritable sign system comprising:
   a rewritable sign comprising:
      a first transparent panel,
      a second panel,
      a cholesteric liquid crystal layer disposed between the first transparent panel and the second panel; and
   an information writer that is external to the rewritable sign and comprises:
      an information inputs,
      a plurality of electrodes adapted to establish localized electric fields through the cholesteric liquid crystal layer when the information writer is in proximity to the rewritable sign, and
      one or more electrical circuits coupled between the information input and the plurality of electrodes.

2. The rewritable sign system according to claim 1 wherein:
   the plurality of electrodes comprise an array of pixel electrodes.

3. The rewritable sign system according to claim 2 wherein:
   the one or more electrical circuits comprise an active matrix.

4. The rewritable sign system according to claim 3 wherein:
   the one or more electrical circuits further comprise:
      a driver coupled to the active matrix wherein in the driver is adapted to apply one of a plurality of signals to the active matrix in response to information received through the information input.

5. A rewritable sign comprising:
   a first panel that is transparent;
   a second panel; and
   a cholesteric liquid crystal layer disposed between the first panel and the second panel;
   wherein the rewritable sign is adapted to electrically couple to external electrical circuitry for establishing localized electric fields to the cholesteric liquid crystal layer.

6. The rewritable sign according to claim 5 further comprising:
   a conductive ground plane disposed on a side of the cholesteric liquid crystal layer opposite the first panel.

7. The rewritable sign according to claim 6 wherein:
   the conductive ground plane further comprises:
      a portion that extends peripherally beyond the first panel.

8. A rewritable information presentation medium comprising:
   a first transparent panel comprising:
      a first side, and
      a second side;
   a second panel comprising:
      a first side, and
      a second side;
   a cholesteric liquid crystal layer disposed between the first transparent panel and the second panel, the cholesteric liquid crystal layer including:
      a first side of the cholesteric liquid crystal layer that faces the second side of the first transparent panel; and
      a second side of the cholesteric liquid crystal layer that faces the first side of the second transparent panel; and
   a first plurality conductors for applying electric fields to the cholesteric liquid crystal layer, the first plurality of conductors including first terminal portions that are adapted to electrically and disengageably couple to an external drive signal source for establishing localized electric fields to the cholesteric liquid crystal layer.

9. The rewritable information presentation medium according to claim 8:
   wherein the first plurality of conductors are transparent and are supported on the first transparent panel; and
   further wherein the rewritable information presentation medium further comprises:
      a second plurality of conductors that are supported on the second panel proximate the second side of the cholesceric liquid crystal layer, and include second terminal portions adopted for disengageably coupling to the drive signal source.

10. The rewritable information presentation medium according to claim 9 wherein:
    the first plurality of conductors are supported on the first side of the first transparent panel;

the second panel includes a margin that extends peripherally beyond the first transparent panel; and the second plurality of conductors are supported on the first side of the second panel, and the second plurality of conductors include terminal portions that are located on the margin.

11. A rewritable information presentation system comprising the rewritable information presentaion medium according to claim 10 and further comprising:

an information writer including:

one or more electrical circuits for generating signals for writing information to the rewritable information presentation medium;

a plurality of contacts coupled to the one or more electrical circuits, wherein the plurality of contacts are adapted for disengageably coupling to the first terminal portions of the first plurality of conductors and to the second terminal portions of the second plurality of conductors.

12. The rewritable information presentation system according to claim 11 wherein:

the plurality of contacts include elastomeric contacts.

13. The rewritable information presentation medium according to claim 9 wherein:

the first plurality of conductors comprise a first set of linear conductors that are parallel to each other; and the second plurality of conductors comprise a second set of linear conductors that are parallel to each other and perpendicular to the first set of linear conductors.

14. A rewritable information presentation medium as recited in claim 8 comprising a wireless communication device.

15. A portable electronic apparatus comprising:

a housing; and a rewritable sign supported on the housing, wherein the rewritable sign is a passive device, and further wherein the rewritable sign is disengageably coupled to an information source.

16. The portable electronic apparatus according to claim 15 wherein the rewritable sign comprises:

a first transparent panel;

a second panel; and a cholesteric liquid crystal material layer disposed between the first transparent panel and the second panel, the cholesteric liquid crystal material layer having a first side facing the first transparent panel and a second side facing the second panel.

17. The portable electronic apparatus according to claim 16 wherein the rewritable sign further comprises:

a first plurality of electrodes disposed proximate the first side of the cholesteric liquid crystal material layer, the first plurality of electrodes including first terminal portions adapted for detachably coupling to a signal source; and a second plurality of electrodes disposed proximate the second side of the cholesteric liquid crystal material layer, the second plurality of electrodes including second terminal portions adapted for detachably coupling to the signal source.

18. The portable electronic apparatus according to claim 16 wherein:

the rewritable sign does not include electrical circuitry for applying localized electric fields to the cholesteric liquid crystal layer.

19. A method for writing information on a rewritable sign having a cholesteric liquid crystal layer, the method comprising the steps of:

holding an information writer in proximity to the rewritable sign;

applying one or more voltage signals to one or more electrodes within the information writer;

establishing one or more electric fields between the pixel electrodes and a ground plane of the rewritable sign; and passing the one or more electric fields through a cholesteric liquid crystal layer of the rewritable sign thereby altering a phase of the cholesteric liquid crystal layer in localized regions thereby writing information on the rewritable sign.

20. The method as recited in claim 19 wherein the holding step comprises:

holding the information writer with a front surface of the information writer overlying the rewritable sign.

21. The method as recited in claim 19 further comprising the step of:

applying one or more high magnitude fields to induce a planar cholesteric phase.

22. The method as recited in claim 19 further comprising the step of:

applying one or more lower magnitude fields to induce a focal conic phase.

23. The method as recited in claim 19 wherein the one or more electrodes comprise electrodes selected from a group consisting of an array of pixel electrodes, electrodes with predefined text patterns, and electrodes with predefined graphics patterns.

* * * * *